United States Patent
Goyal et al.

(10) Patent No.: US 12,541,958 B2
(45) Date of Patent: *Feb. 3, 2026

(54) DIVERSITY-AWARE WEIGHTED MAJORITY VOTE CLASSIFIER DECISION MAKING ON FOR IMBALANCED DATASETS

(71) Applicant: NEC Corporation, Tokyo (JP)

(72) Inventors: Anil Goyal, Heidelberg (DE); Jihed Khiari, Heidelberg (DE)

(73) Assignee: NEC Corporation, Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 18/532,248

(22) Filed: Dec. 7, 2023

(65) Prior Publication Data

US 2024/0112453 A1 Apr. 4, 2024

Related U.S. Application Data

(63) Continuation of application No. 17/612,281, filed as application No. PCT/EP2019/064900 on Jun. 6, 2019.

(51) Int. Cl.
*G06V 10/774* (2022.01)
*G06N 20/20* (2019.01)
(Continued)

(52) U.S. Cl.
CPC ......... *G06V 10/7747* (2022.01); *G06N 20/20* (2019.01); *G06V 10/817* (2022.01); *G06V 10/87* (2022.01)

(58) Field of Classification Search
CPC ...... G06N 20/20; G06N 3/08; G06V 10/7747; G06V 10/817; G06V 10/87; G06V 10/82;
(Continued)

(56) References Cited

U.S. PATENT DOCUMENTS 9,224,104 B2  12/2015  Lin et al.
11,544,570 B2  1/2023  Roy
(Continued)

FOREIGN PATENT DOCUMENTS

WO  2018/167404 A1  9/2018

OTHER PUBLICATIONS

Paass, G., & Kindermann, J. (Apr. 1998). Bayesian classification trees with overlapping leaves applied to credit-scoring. In Pacific-Asia Conference on Knowledge Discovery and Data Mining (pp. 234-245). Berlin, Heidelberg: Springer Berlin Heidelberg. (Year: 1998).*

(Continued)

*Primary Examiner* — Andrew L Tank
(74) *Attorney, Agent, or Firm* — Sughrue Mion, PLLC (57) ABSTRACT

An ensemble learning based method is for a binary classification on an imbalanced dataset. The imbalanced dataset has a minority class comprising positive samples and a majority class comprising negative samples. The method includes: generatively oversampling the imbalanced dataset by synthetically generating minority class examples, thereby generating a generated dataset; using the generated dataset to generate subsamples, and learning a base classifier on each of the subsamples to determine a plurality of base classifiers; and learning a weighted majority vote classifier by combining outputs of the base classifiers. Each of the base classifiers is assigned a weight in such a way that a diversity between the base classifiers on the positive samples is minimized.

15 Claims, 4 Drawing Sheets

(51) Int. Cl.
*G06V 10/70* (2022.01)
*G06V 10/80* (2022.01)

(58) Field of Classification Search
CPC ...... A61B 5/7267; G16H 50/20; G16H 50/30; G16H 50/70
See application file for complete search history.

(56) References Cited

U.S. PATENT DOCUMENTS

| | | |
|---|---|---|
| 11,676,719 B2 | 6/2023 | Feczko et al. |
| 2005/0069936 A1 | 3/2005 | Diamond et al. |
| 2014/0257122 A1 | 9/2014 | Ong et al. |
| 2018/0144352 A1 | 5/2018 | Ram et al. |
| 2019/0130215 A1 | 5/2019 | Kaestle et al. |
| 2019/0213605 A1 | 7/2019 | Patel et al. |
| 2019/0370384 A1 | 12/2019 | Dalek et al. |
| 2020/0005901 A1 | 1/2020 | Cohen et al. |
| 2020/0050964 A1 | 2/2020 | Vassilev |
| 2020/0334744 A1 | 10/2020 | Gupta et al. |

OTHER PUBLICATIONS

Zhang Yongqing, Zhu Min, Zhang Danling, Mi Gang and Ma Daichuan, "Improved SMOTEBagging and its application in imbalanced data classification," IEEE Conference Anthology, China, 2013, pp. 1-5, doi: 10.1109/ANTHOLOGY.2013.6784957. (Year: 2013).*

Morvant et al., (2014). Majority vote of diverse classifiers for late fusion. In Structural, Syntactic, and Statistical Pattern Recognition: Joint IAPR International Workshop, S+ SSPR 2014, Joensuu, Finland, Aug. 20-22, 2014. Proceedings (pp. 153-162), Springer Berlin Heidelberg (Year: 2014).*

B. Das, N. C. Krishnan and D. J. Cook, "RACOG and wRACOG: Two Probabilistic Oversampling Techniques," in IEEE Transactions on Knowledge and Data Engineering, vol. 27, No. 1, pp. 222-234, Jan. 1, 2015, doi: 10.1109/TKDE.2014.2324567. (Year: 2015).*

Lim, Pin, Chi Keong Goh, and Kay Chen Tan. "Evolutionary cluster-based synthetic oversampling ensemble (eco-ensemble) for imbalance learning." IEEE transactions on cybernetics 47.9 (2016): 2850-2861. (Year: 2016).*

Wang H, Xu Q, Zhou L. Large unbalanced credit scoring using Lasso-logistic regression ensemble. PLoS One. 2015;10(2): e0117844. Published Feb. 23, 2015. doi:10.1371/journal.pone.0117844 (Year: 2015).*

Bennin et al., "MAHAKIL: Diversity Based Oversampling Approach to Alleviate the Class Imbalance Issue in Software Defect Prediction," in IEEE Transactions on Software Engineering, vol. 44, No. 6, pp. 534-550, Jun. 1, 2018, doi: 10.1109/TSE.2017.2731766. (Year: 2018).*

Douzas, Georgios, and Fernando Bacao. "Effective data generation for imbalanced learning using conditional generative adversarial networks." Expert Systems with applications 91 (2018): 464-471. (Year: 2018).*

I. Kononenko, "Machine learning for medical diagnosis: history, state of the art and perspective", Artificial Intelligence in medicine, 23.1, (2001):89-109.

Z. Ding, "Diversified ensemble classifiers for highly imbalanced data learning and their application in bioinformatics" (2011).

G. N. Hortobagyi, "Treatment of breast cancer", New England Journal of Medicine 339.14 (1998), pp. 974-984.

Kou, Yufeng, et al., "Survey of fraud detection techniques", IEEE International Conference on Networking, Sensing and Control, 2004. Vol. 2. IEEE, 2004, pp. 749-754.

A report from Javelin Strategy and Research firm published in 2015, retrieved from the Internet on May 2, 2025, https://www.javelinstrategy.com/press-release/false-positive-card-declines-push-consumersabandon-issuers-and-merchants.

"Credit Card Fraud Detection" dataset, retrieved from the Internet on May 14, 2025, https://urldefense.com/v3/_https://www.kaggle.com/datasets/mlg-ulb/creditcardfraud_;!!OhYLZkit9p47d2A!u8z5fhdR7sx7Gm-rspQAuBvwBk6WUHDWTT2eTg-hovo0Klvn3qXnu2x3plRgxuV3P6aUxT82WaUsdBSYxPPHvg$.

R. Wedge et al., "Solving the False Positives Problem in Fraud Prediction Using Automated Feature Engineering", Joint European Conference on Machine Learning and Knowledge Discovery in Databases, Springer, Cham, 2018.

"Breast Cancer Wisconsin diagnostic", retrieved from the internet on May 14, 2025, https://urldefense.com/v3/_https://archive.ics.uci.edu/dataset/17/breast*cancer*wisconsin*diagnostic_;Kysr!!OhYLZkit9p47d2Alt28VFZtlw0Nx6y7VMD8wnub34dLfthJ9onSDmlAZwZzCuFXp0daL1sXt47m_nQW573YkzBUMj3pXtV2dxeU_PmZBfg$.

"Pima Indians diabetes database", retrieved from the Internet on May 14, 2025, https://urldefense.com/v3/_https://www.kaggle.com/datasets/uciml/pima-indians-diabetes-database_;!!OhYLZkit9p47d2A!u8z5fhdR7sx7Gm-rspQAuBvwBk6WUHDWTT2eTg-hovo0Klvn3qXnu2x3plRgxuV3P6aUxT82WaUsdBSjM6YYjg$.

Chawla, et al., "Exploiting Diversity in Ensembles: Improving the Performance on Unbalanced Datasets," *Multiple Classifier Systems*, May 23, 2007, pp. 397-406, Springer Verlag, Berlin, Germany.

Wang, et al., "Diversity Analysis on Imbalanced Data Sets by Using Ensemble Models," *IEEE Symposiums on Computational Intelligence and Data Mining*, Mar. 30, 2009, pp. 324-331, Institute of Electrical and Electronics Engineers, Piscataway, NJ, USA.

Wang, et al., "Relationships Between Diversity of Classification Ensembles and Single-Class Performance Measures," *IEEE Transaction on Knowledge and Data Engineering* 25, 1, Jan. 1, 2013, pp. 206-219, Insitute of Electrical and Electronics Engineers, Piscataway, NJ, USA.

Galar, et al., "A Review on Ensembles for the Class Imbalance Problem: Bagging-, Boosting-, and Hybrid-Based Approaches," *IEEE Transactions on Systems, Man, and Cybernectics—Part C: Applications and Reviews* 42, 4, Jul. 1, 2012, pp. 463-484, Institute of Electrical and Electronics Engineers, Piscataway, NJ, USA.

He, et al., "Learning from imbalanced Data," *IEEE Transactions on Knowledge and Data Engineering* 21, 9, Sep. 1, 2009, pp. 1263-1284, Institute of Electrical and Electronics Engineers, Piscataway, NJ, USA.

US Office Action for U.S. Appl. No. 17/612,281, mailed on Feb. 11, 2025.

C.-L. Liu and P.-Y. Hsieh, "Model-Based Synthetic Sampling for Imbalanced Data," in IEEE Transactions on Knowledge and Data Engineering, vol. 32, No. 8, pp. 1543-1556, Aug. 1, 2020, doi: 10.1109/TKDE.2019.2905559. (Year: 2019).

T Ryan Hoens et al., "Imbalanced Datasets: From Sampling to Classifiers," in Imbalanced Learning: Foundations, Algorithms, and Applications, IEEE, 2013, pp. 43-59, doi: 10.1002/9781118646106.ch3. (Year: 2013).

M. Y. Arafat et al., "Cluster-based under-sampling with random forest for multiclass imbalanced classification," 2017 11th International Conference on Software, Knowledge, Information Management and Applications (SKIMA), Malabe, Sri Lanka, 2017, pp. 1-6, doi: 10.1109/SKIMA.2017.8294105. (Year: 2017).

A-D. Lipitakis and S. Kotsiantis, "A hybrid Machine Learning methodology for imbalanced datasets," IISA 2014, The 5th International Conference on Information, Intelligence, Systems and Applications, Chania, Greece, 2014, pp. 252-257, doi: 10.1109/IISA.2014.6878762. (Year: 2014).

Felix Last et al., "Oversampling for Imbalanced Learning Based on K-Means and SMOTE," arXiv:1711.00837v2 submitted on 2017, 19 pages.

US Office Action for U.S. Appl. No. 18/530,960, mailed on Jun. 17, 2025.

Chandra, Arjun, and Xin Yao, "Ensemble learning using multi-objective evolutionary algorithms." Journal of Mathematical Modelling and Algorithms 5 (2006): 417-445. (Year: 2006).

Parvin, Hamid, et al. "A scalable method for improving the performance of classifiers in multiclass applications by pairwise classifiers (56) References Cited

OTHER PUBLICATIONS and GA" 2008 fourth international conference on networked computing and advanced information management. vol. 2. IEEE, 2008. (Year: 2008), pp. 137-142.

Fernandes, Everlandio RQ, Andre CPLF de Carvalho, and Andre LV Coelho. "An evolutionary sampling approach for classification with imbalanced data." 2015 international joint conference on neural networks (IJCN N). IEEE, 2015. (Year: 2015).

Onan, Aytug, Serdar Korukoglu, and Hasan Bulut. "A multiobjective weighted voting ensemble classifier based on differential evolution algorithm for text sentiment classification." Expert Systems with Applications 62 (2016): 1-16. (Year: 2016).

Saleena, Nabizath. "An ensemble classification system for twitter sentiment analysis." Procedia computer science 132 (2018): 937-946. (Year: 2018).

\* cited by examiner

|  | Actual Positive | Actual Negative |
|---|---|---|
| Predicted Positive | True Positive (TP) | False Positive (FP) |
| Predicted Negative | False Negative (FN) | True Negative (TN) |

| | Breast Cancer | | | | Hyper Thyroid | | | | Mammography | | | |
|---|---|---|---|---|---|---|---|---|---|---|---|---|
| | P | R | F1 | AP | P | R | F1 | AP | P | R | F1 | AP |
| R-DT | .9245 | .8518 | .8886 | .8396 | .9487 | .9090 | .9230 | .8731 | .6392 | .5726 | .6036 | .3757 |
| S-DT | .9420 | .8842 | .9118 | .8734 | .8530 | .9696 | .9039 | .8306 | .4142 | .6410 | .5029 | .2750 |
| A-DT | .9382 | .8888 | .9119 | .8721 | .9722 | .9696 | .9696 | .9470 | .4090 | .6324 | .4963 | .2678 |
| R-BG | .9369 | .9537 | .9448 | .9770 | .8931 | 1 | .9432 | .9902 | .5233 | .7051 | .6004 | .6773 |
| S-BG | .9316 | .9351 | .9327 | .9785 | .8730 | 1 | .9310 | .9974 | .4014 | .7606 | .5243 | .6770 |
| A-BG | .9302 | .9814 | .9549 | .9679 | .8931 | 1 | .9432 | 1 | .3832 | .7863 | .5148 | .6126 |
| EE | .9595 | .9768 | .9679 | .9910 | .7056 | 1 | .8627 | .9925 | .1478 | .8632 | .2523 | .5629 |
| BB | .9361 | .9398 | .9376 | .9815 | .8495 | 1 | .9177 | .9877 | .2996 | .8418 | .4410 | .6570 |
| BRF | .9430 | .9907 | .9662 | .9789 | .8032 | 1 | .8863 | 1 | .2251 | .8803 | .3585 | .6559 |
| Invention | .9458 | .9583 | .9516 | .9851 | .8861 | .9393 | .7714 | .9116 | .8520 | .5598 | .6753 | .8871 |

Fig. 3

|  | Scania Predictive Maintenance | | | | Credit Card Fraud Detection | | | |
|---|---|---|---|---|---|---|---|---|
|  | P | R | F1 | AP | P | R | F1 | AP |
| R-DT | .6392 | .6195 | .6292 | .4032 | .7554 | .7162 | .7324 | .5396 |
| S-DT | .5367 | .6777 | .5985 | .3693 | .4510 | .7927 | .5727 | .3576 |
| A-DT | .5298 | .6551 | .5857 | .3545 | .4243 | .7815 | .5490 | .3324 |
| R-BG | .5861 | .8223 | .6843 | .7861 | .7429 | .7860 | .7634 | .7778 |
| S-BG | .5491 | .8214 | .6581 | .7245 | .5667 | .8378 | .6745 | .7881 |
| A-BG | .5179 | .8117 | .6323 | .6644 | .5678 | .8310 | .6730 | .7856 |
| EE | .2598 | .9725 | .4100 | .7534 | .0489 | .9009 | .0927 | .7526 |
| BB | .2741 | .9668 | .4271 | .6901 | .0742 | .8896 | .1371 | .7442 |
| BRF | .2342 | .9749 | .3777 | .6860 | .0672 | .8986 | .1251 | .7346 |
| Invention | .8325 | .6348 | .7202 | .8206 | .9180 | .7567 | .8294 | .8216 |

Fig. 4

DIVERSITY-AWARE WEIGHTED MAJORITY VOTE CLASSIFIER DECISION MAKING ON FOR IMBALANCED DATASETS

CROSS REFERENCE TO RELATED APPLICATIONS

This application is a Continuation of United States Patent Application Ser. No. 17/612,281 filed on November 18, 2021, which is a U.S. National Phase application under 35 U.S.C. § 371 of International Application No. PCT/EP2019/064900, filed on June 6, 2019. The International Application was published in English on December 10, 2020 as WO 2020/244771 A1 under PCT Article 21(2).

FIELD

The present invention relates to machine learning-based classification.

BACKGROUND

Class imbalance problems in machine learning occur when the number of positive examples (i.e. examples from a class of interest) is much smaller than the number of negative examples. This problem has many real-life applications such as fraud detection, predictive maintenance, medical diagnosis, detection of oil spills and many others. Many approaches to solve this problem have been proposed. An overview can be found in He, Haibo, and Edwardo A. Garcia: "Learning from imbalanced data", in *IEEE Transactions on Knowledge & Data Engineering* 9 (2008): 1263-1284, as well as in Galar, Mikel, et al.: "A review on ensembles for the class imbalance problem: bagging-, boosting-, and hybrid-based approaches", in *IEEE Transactions on Systems, Man, and Cybernetics, Part C (Applications and Reviews)* 42.4 (2012): 463-484. Basically, these approaches can be grouped into the following categories:

1. Sampling based strategies: These approaches either remove examples from the respective majority class (by means of undersampling) or they generate synthetic examples for the respective minority class (by means of oversampling). Examples that belong to this category of strategies include ROS, SMOTE, ADASYN RUS, etc.
2. Hybrid Approaches: Approaches belonging to this class typically combine sampling strategies with ensemble learning. Examples include strategies such as SMOTE-Bagging, EasyEnsemble and Balance Random Forests.
3. Cost-Sensitive Approaches: Approaches belonging to this class combine algorithm and data level approaches to consider different classification costs [1,2]. They treat different misclassifications differently. In case of handling imbalanced datasets, they penalize misclassification of the minority class more than misclassification of the majority class and thus aim at a better generalization for the minority class.

SUMMARY

In an embodiment, the present disclosure provides an ensemble learning based method that is for a binary classification on an imbalanced dataset. The imbalanced dataset has a minority class comprising positive samples and a majority class comprising negative samples. The method includes: generatively oversampling the imbalanced dataset by synthetically generating minority class examples, thereby generating a generated dataset; using the generated dataset to generate subsamples, and learning a base classifier on each of the subsamples to determine a plurality of base classifiers; and learning a weighted majority vote classifier by combining outputs of the base classifiers. Each of the base classifiers is assigned a weight in such a way that a diversity between the base classifiers on the positive samples is minimized.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure relates to machine learning-based classification, and more particularly, to ensemble learning based methods and systems for a binary classification task on an imbalanced dataset, wherein the dataset includes a minority class comprising positive samples and a majority class comprising negative samples.

Aspects of the present invention improve and further develop hybrid approaches in such a way that a low false positive rate is achieved.

In accordance an aspect of the present invention, there is provided an ensemble learning based method for a binary classification task on an imbalanced dataset D, wherein the dataset D includes a minority class comprising positive samples and a majority class comprising negative samples, the method comprising:

generatively oversampling the dataset D by synthetically generating minority class examples, thereby generating dataset D', using the generated dataset D' to generate K subsamples $D'_i$, and learning a base classifier $h_i$ on each subsample $D'_i$, and learning a weighted majority vote classifier by combining the outputs of the base classifiers $h_i$, wherein each of the base classifiers $h_i$ is assigned a weight in such a way that the diversity between the base classifiers $h_i$ on the positive samples is minimized.

Furthermore, an aspect of the present invention provides a system for executing an ensemble learning based method for a binary classification task on an imbalanced dataset D, wherein the dataset D includes a minority class comprising positive samples and a majority class comprising negative samples, the system consisting of one or more computer processes which, alone or in combination, provide for the execution of the following steps:

generatively oversampling the dataset D by synthetically generating minority class examples, thereby generating dataset D', using the generated dataset D' to generate K subsamples $D'_i$, and learning a base classifier $h_i$ on each subsample $D'_i$, and learning a weighted majority vote classifier by combining the outputs of the base classifiers $h_i$, wherein each of the base classifiers $h_i$ is assigned a weight in such a way that the diversity between the base classifiers $h_i$ on the positive samples only is minimized.

According to embodiments of the invention, the inventors have recognized that the improvements to the state of the art can be accomplished by means of a hybrid approach based on a resampling and ensemble learning technique to deal with imbalanced classification without considering a cost-sensitive approach and without relying on feature engineering. Embodiments of the invention relate to an ensemble learning-based method for imbalanced binary classification tasks that comprises learning a diversity-aware weighted majority vote classifier over the base classifiers combined with a generative oversampling strategy for minority class examples. Embodiments of the present invention provide a solution that has a low false positive rate on the final learned classifier. Embodiments deliver benefits in terms of higher classification Precision, F1-Score and Average Precision, especially in three main applications, i.e. cancer detection in mammography, predictive maintenance, and credit card fraud detection.

According to embodiments of the invention, given the original imbalanced dataset, oversampling may be performed for the samples belonging to the minority class. The oversampling may the done using kNN (k-nearest neighbor) and a multivariate probability distribution. In this context, in a first step "safe" samples may be selected using kNN and then the parameters for a multivariate probability distribution may be learned. Finally, positive samples (minority class) may be synthetically generated from a chosen multivariate probability distribution. Oversampling positive examples using kNN and a multivariate probability distribution makes it possible to generate synthetic positive samples based on a chosen probability distribution instead of an interpolation, as done in baseline approaches. Moreover, the usage of kNN allows to select number of positive samples which are more representative of the original data distribution.

According to embodiments of the invention it may be provided that, given the generated oversampled dataset, a number of random and stratified subsamples may be generated from this dataset. For each of these subsamples a classification model maybe learned. The learned classification models can be either homogeneous (i.e. using the same learning algorithm) or heterogeneous (i.e. using different learning algorithms). This technique outputs learners (or in other words models) corresponding to each subsample that can be combined with each other in order to generate a final learned classifier.

According to embodiments of the invention it may be provided that, given the base classifier/learners generated as described above, a diversity-aware weighted majority vote classifier may be learned. Learning a diversity-aware weighted majority vote classifier over the base learners may be done by minimizing the classification error of the weighted majority vote as well as diversity within the base learners on the positive examples only. This is in contrast to state-of-art approaches that involve uniform majority vote over the base learners. Intuitively, this step allows base learners to agree on positive examples, forcing the final weighted majority vote to have low number of False Positives (FP).

There are several ways how to design and further develop the teaching of the present invention in an advantageous way. To this end it is to be referred to the following explanation of exemplary embodiments of the invention by way of example, and illustrated by the figures. In connection with the explanation of the exemplary embodiments of the invention by the aid of the figures, generally exemplary embodiments and further developments of the teaching will be explained.

Generally, it is important to choose the machine learning approach according to the use case at hand. Embodiments of the present invention deal with imbalanced classification without considering a cost-sensitive approach, putting a focus on use cases where the number of false positives (FP) may be significantly larger than the number of false negatives (FN) and where the impact of FP is more penalizing. For example, in case of credit card fraud detection, it may be undesirable to automatically block a credit card without an expert approval. In this context, the goal of a machine learning algorithm can be to give a short list of alerts to prevent the expert to examine thousands of transactions. Similarly, in the case of predictive maintenance task, it may be undesirable to call an engineer to inspect unaffected parts for cost saving or, in medical diagnosis, it may be undesirable to fit patients to go through potentially harmful and costly medical examinations.

Figure 1:
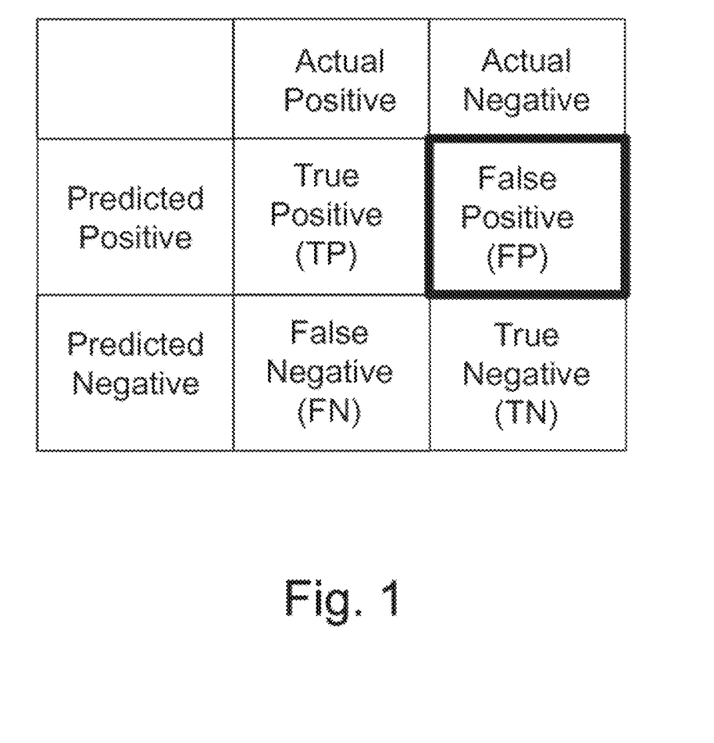
FIG. 1 is a confusion matrix that corresponds to evaluation metrics putting a focus on a low false positive rate according to embodiments of the invention.

In view of the above, embodiments of the invention obtain a final learned classifier that has a low false positive rate. Therefore, embodiments of the invention may rely on an evaluation of F1-Measure, Precision and Average Precision, which are defined as follows:

$$\text{Precision}(P) = \frac{TP}{TP + FP}$$

$$\text{Recall}(R) = \frac{TP}{TP + FN}$$

$$F_1 = \frac{2 \cdot P \cdot R}{P + R}$$

$$AP = \sum_n (R_m - R_{m-1}) P_m$$

The confusion matrix that corresponds to the above evaluation metrics is shown in FIG. 1.

It should be noted that the Average Precision (AP) as defined above summarizes the precision-recall curve as the weighted mean of precisions achieved at each threshold, with the increase in recall from the previous threshold as the weight. $R_m$ and $P_m$ are the precision and recall at the n-th threshold.

Figure 2:
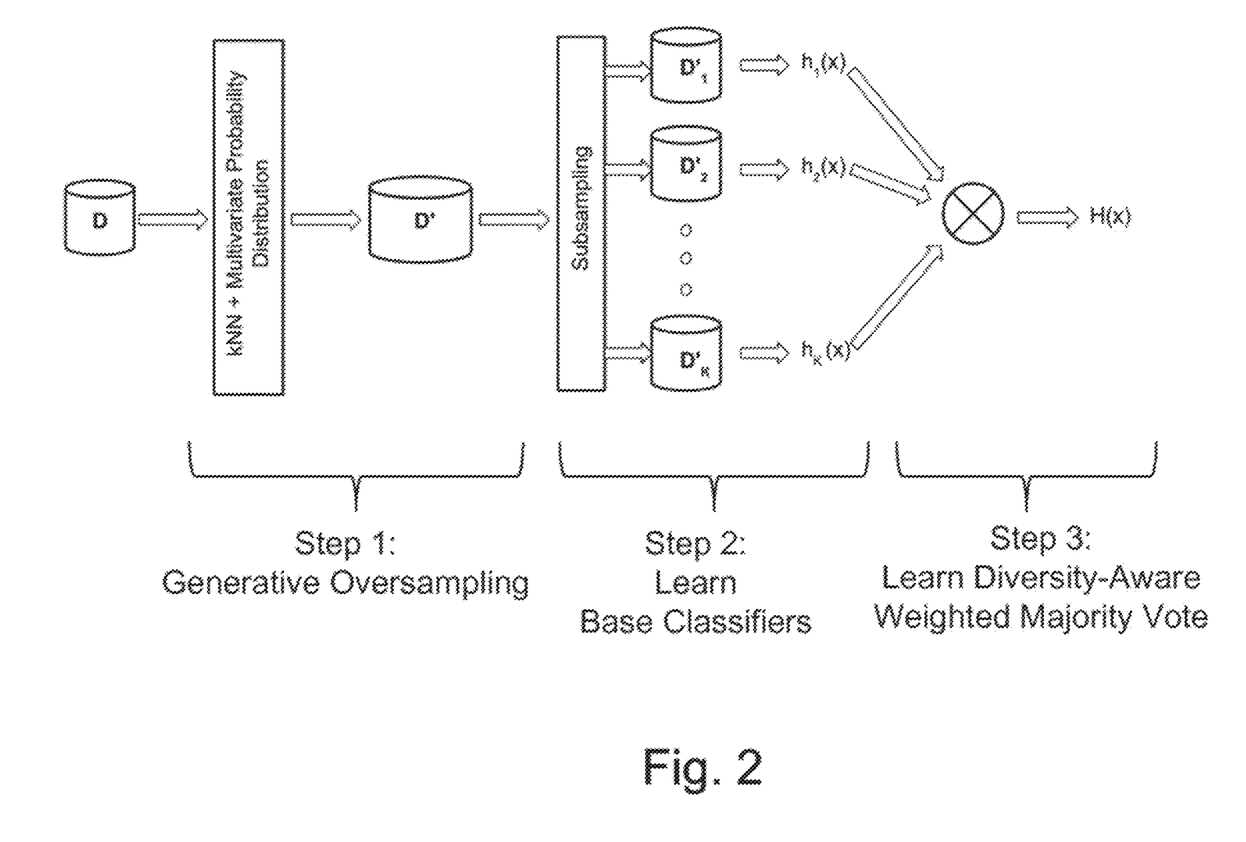
FIG. 2 is a schematic illustration showing the steps of an ensemble learning based method for a classification task on an imbalanced dataset according to an embodiment of the invention.

FIG. 2 shows a pipeline of the generic steps of an ensemble learning based method for a classification task on an imbalanced dataset D according to an embodiment of the invention.

A first step, denoted "Generative Oversampling" in FIG. 2, is configured to synthetically generate minority class examples. According to embodiments this step may be performed by using k-nearest neighbors (kNN) and a multivariate probability distribution.

More specifically, the generative oversampling approach may include, as a first step, the selection of safe examples from all the positive (minority class) samples, e.g. by using kNN. In this context, a positive example is denoted a safe example if the majority vote of 'k' nearest neighbors for that example is positive. Intuitively, using kNN allows to select few positive samples that are more representative of the original data distribution D. Next, for the selected safe examples, the parameters for a multivariate probability distribution may be learned. Finally, synthetic examples for the positive (i.e. minority) class may be generated based on a multivariate probability distribution using the parameters learned from the safe examples. The outcome of the generative oversampling step is a modified dataset, denoted D' in FIG. 2.

A second step, denoted "Learn Base Classifiers" in FIG. 2, builds on the modified dataset D' obtained after the oversampling step. Specifically, according to embodiments, the dataset D' may be used to generate a number of K new subsamples each of size n'. Hereinafter, these subsamples are denoted D'$_i$ where i is in [1, ..., K]. n' is a fraction of the size of D', e.g. 20%.

According to an embodiment the subsampling may be performed in a random and stratified way. This means that each of the samples D'$_i$, contains random examples from D', but with the same ratio of class distribution as in D'.

As illustrated in FIG. 2, at a next stage of the second step, base models h$_i$, where i is in [1, ..., K], are learned on each of the subsamples D'$_i$. According to embodiments, these base models h$_i$ may include, but not limited to, Decision Trees, Logistic Regression or Support Vector Machines (SVMs). As will be appreciated by those skilled in the art, the step can be easily adapted to these different types of base learners.

According to an embodiment, it may be provided that the same learning algorithm is applied for each of the subsamples D'$_i$, i.e. the same learning algorithm is used to learn different base models h$_i$. According to an alternative embodiment, heterogeneous learning algorithms may be learned on different subsamples. Finally, the outputs of the base learners h$_i$ are combined with each other, as described in detail below and as shown in step 3 of FIG. 2.

Step 3, which is denoted in FIG. 2 "Learn Diversity-Aware Weighted Majority Vote Classifier" addresses, given the base learners h$_i$ from step 2, the learning of a diversity-aware weighted majority vote classifier. Specifically, according to an embodiment this step comprises the learning of weights over the base learners h$_i$ such that the final returned weighted majority vote classifier, denoted H, for any input example x is expressed as following:

$$\min_w \sum_{j=1}^{n_+} D'(j) \left( \left[ \sum_{k=1}^{K} w(k) \cdot h_k(x_j) - y_j \right] \right)^2 +$$

$$\sum_{k=1}^{K} \sum_{k'=1}^{K} [w(k) \cdot h_k(x_j) - w(k') \cdot h_{k'}(x_j)]^2$$

$$\text{s.t.} \sum_{k=1}^{K} w(k) = 1$$

$$H(x) = \sum_{k=1}^{K} w(k) \cdot h_k(x)$$

where, w is the weight vector over the base classifiers, w(k) is the weight of k$^{th}$ classifier and h$_k$(x) is the output of the k$^{th}$ classifier. It should be noted that learning the weights w(k) over the classifiers h$_k$(x) does not require any hyperparameters to tune for the base learners.

As already mentioned above, embodiments of the present invention address situations of handling imbalanced data where the minority class (i.e., the positive class) is the class of interest, and where it is in objective to minimize the number of False Positives (FP). Generally, controlling the diversity between the classifiers may be considered a key element in classifier combination approaches (for reference, see Ludmila I. Kuncheva: "Combining Pattern Classifiers: Methods and Algorithms", in *Wiley-Interscience*, 2004. ISBN 0471210781). Based thereupon and in order to achieve the above objective, according to embodiments of the present invention it may be provided to minimize the diversity (or in other words, to increase the agreement) between the base learners h$_i$ on the positive examples only. Intuitively, this allows base learners h$_i$ to agree on positive examples and forcing the final weighted majority vote (as defined above) to have a low number of False Positives (FP).

Therefore, according to embodiments of the invention the following optimization problem may be provided:

where n$_+$ is the number of positive examples in the complete oversampled data D'$_i$ and D'(j) is the weight for the j$^{th}$ positive example in the oversampled data D'$_i$. In the above optimization problem, the first term corresponds to a classification error of the weighted majority vote and the second term corresponds to the diversity between each pair of classifiers [h$_k$, h$_k$'] on the positive examples. By minimizing the diversity between the base learners h$_i$, it can be ensured that the learners "agree" on the predictions on positive examples, which increases the certainty about the final prediction. Ultimately, this leads to a low number of False Positives (FP) which is a key objective for handling imbalanced data.

As will be appreciated by those skilled in the art there are other possibilities to control the diversity while learning a weighted majority vote classifier to handle imbalanced datasets. For example, according to embodiments of the invention it may be provided that a regularized version of the above minimization problem is used. Furthermore, alternatively or additionally it is possible to use C-Bound (from PAC-Bayesian theory) in order to learn the weighted majority vote classifier H.

To demonstrate the potential of the ensemble learning based method according to an embodiment of the present invention, the method has been carried out on a number of different imbalanced datasets. Specifically, experiments have been carried out on the dataset presented in the following table:

| Datasets | #Examples | #Features | % Positive Instances |
|---|---|---|---|
| Breast Cancer | 683 | 9 | 34.97 |
| Hyper Thyroid | 215 | 5 | 16.29 |
| Mammography | 11,183 | 6 | 2.32 |
| Scania Predictive Maintenance | 60,000 | 170 | 1.67 |
| Credit Card Fraud Detection | 284,807 | 30 | 0.172 |

According to the used experimental protocol, the generative oversampling (i.e. step 1 shown in FIG. 2) is executed by fixing 'k=5' for kNN and by choosing a multivariate Gaussian distribution for generating the synthetic examples. For the selected safe examples, the mean and covariance matrix are computed for each feature of input data. Finally, the step continues by generating the equal number of synthetic examples as the number of positive examples in the training data set D using learned multivariate Gaussian distribution.

Turning to step 2 as shown in FIG. 2, for base learners $h_i$ the embodiment learns 'K=100' decision tree classifiers by randomly selecting 20% of the oversampled training dataset D' for each of the subsamples $D'_i$.

Finally, in order to learn the diversity-aware weighted majority vote classifier H, as shown in step 3 of FIG. 1, an 80% weight is assigned to the original data samples and a 20% weight to newly generated synthetic positive samples. Intuitively, this step helps to learn a well performing weighted majority vote classifier H focused on the original positive examples.

Figure 3:
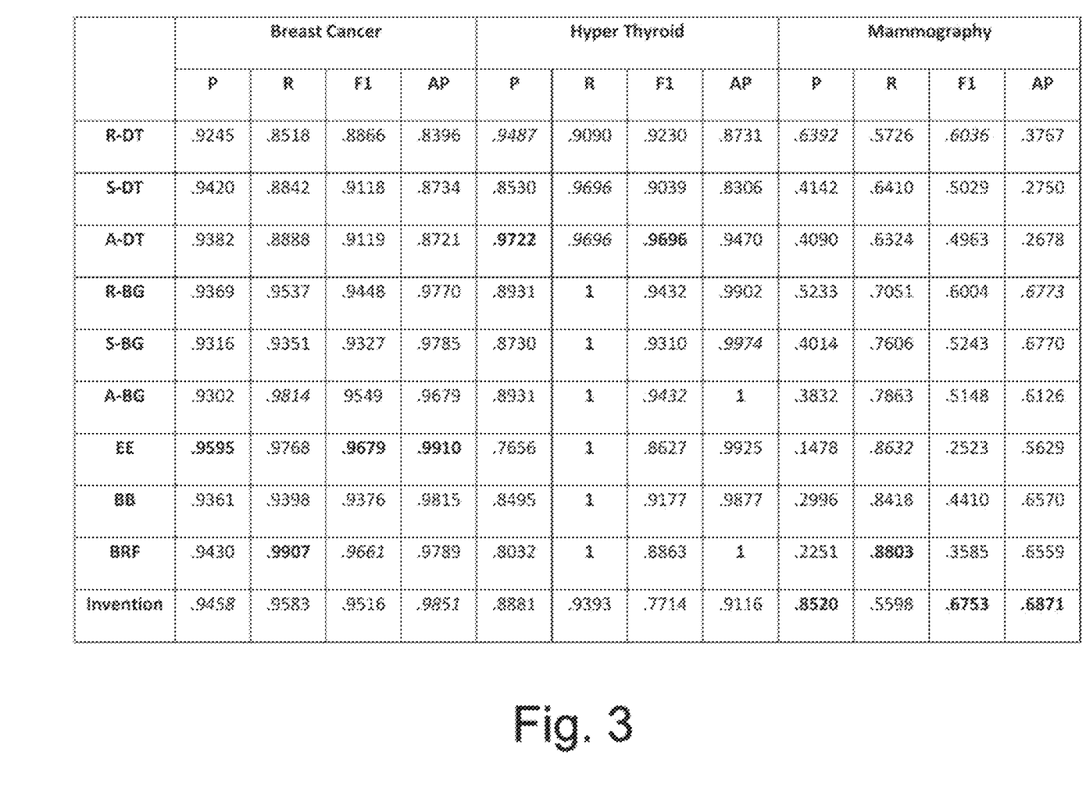
FIG. 3 is a table showing experimental results of an ensemble learning based method applied on medical datasets according to an embodiment of the invention.
Figure 4:
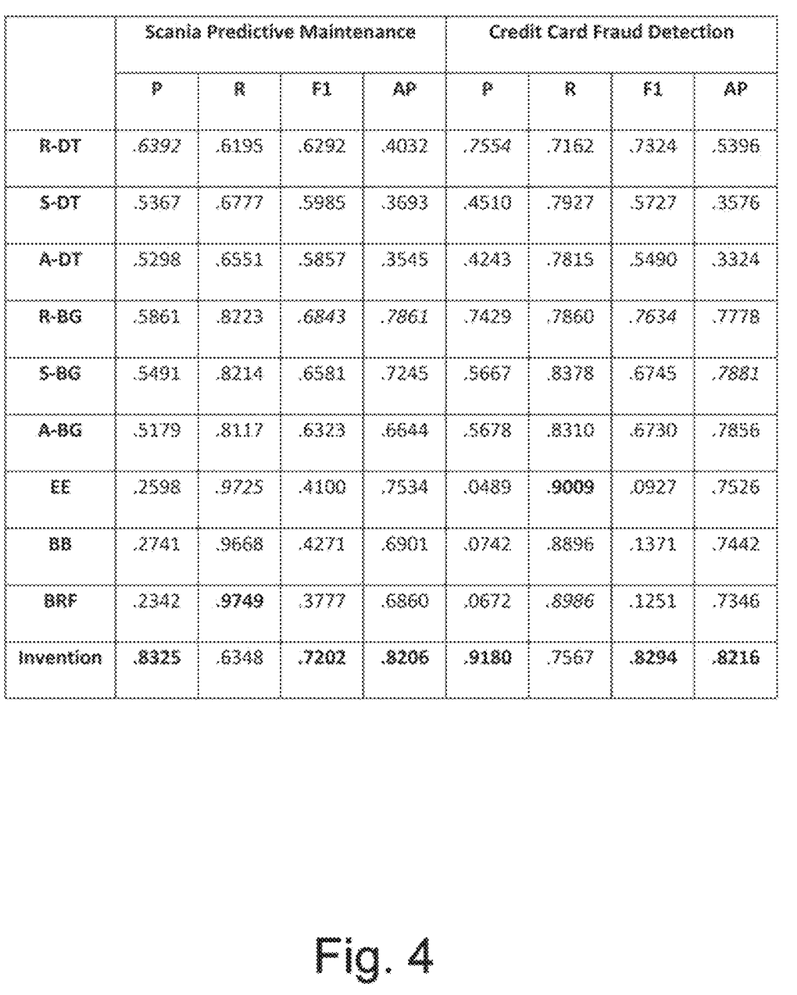
FIG. 4 is a table showing experimental results of an ensemble learning based method applied on predictive maintenance (left) and credit card fraud detection (right) datasets according to embodiments of the invention.

To evaluate the efficiency of the method according to the above embodiment, the method has been compared with a number of state-of-art models. The experimental results are summarized in the tables shown in FIGS. 3 and 4. The comparative state-of-the-art models include the following models (the respective abbreviations being used in FIGS. 3 and 4):

1. Random Oversampling+DT (R-DT): This approach oversamples the minority class by picking samples at random with replacement. Finally, we learn a decision tree classifier on oversampled data.
2. SMOTE Oversampling+DT (S-DT): This approach oversamples the minority class using Synthetic Minority Over Sampling Technique (SMOTE). Finally, we learn a decision tree classifier on oversampled data.
3. ADASYN Oversampling+DT (A-DT): This approach oversamples the minority class using Adaptive Synthetic (ADASYN) approach. Finally, we learn a decision tree classifier on oversampled data.
4. Random Oversampling+Bagging (R-BG): This approach oversamples the minority class by picking samples at random with replacement. Finally, we learn a bagging classifier with decision tree classifier as base learner.
5. SMOTE Oversampling+Bagging (S-BG): This approach oversamples the minority class using Synthetic Minority Over Sampling Technique (SMOTE). Finally, we learn a bagging classifier with decision tree classifier as base learner.
6. ADASYN Oversampling+Bagging (A-BG): This approach oversamples the minority class using Adaptive Synthetic (ADASYN) approach. Finally, we learn a bagging classifier with decision tree classifier as base learner.
7. Easy Ensemble (EE): This approach learns an ensemble of AdaBoost learners trained on different balanced bootstrap samples.
8. Balanced Bagging (BB): This approach first balances the dataset using Random Under Sampler. Then, Bagging Classifier is learnt on balanced data.
9. Balanced Random Forests (BRF): This approach is an ensemble method in which each tree of forest will be provided with a balanced bootstrap sample.

The tables shown in FIGS. 3 and 4 report the results for different datasets averaged over three random experiments. Specifically, the tables present Precision(P), Recall(R), F1-score (F1) and Average Precision (AP), wherein, along the columns, best results are in bold and second best in italics.

From these results, one can deduce that the approach according to embodiments of the present invention performs better than all the baselines for three datasets (Mammography, Scania Predictive Maintenance and Credit Card Fraud detection) in terms of Precision (P), F1-Score (F1) and Average Precision (AP). In the presented use cases, it was the objective to obtain a final learned classifier having a low false positive rate. Therefore, Precision (P), F1-Score (F1) and Average Precision (AP) are important metrics for the evaluation of the method according to an embodiment of the present invention. Moreover, the method according to an embodiment of the invention performs best in cases where the percentage of positive samples is less than 15%, which is in itself a challenging task to solve.

Embodiments of the present invention can be applied, e.g., in the technical field of medical diagnosis. Machine learning techniques are commonly used for medical diagnosis since most modern hospitals perform data collection and analysis on a large scale (for reference, see I. Kononenko: "Machine learning for medical diagnosis: history, state of the art and perspective", in *Artificial Intelligence in medicine*, 23.1 (2001): 89-109). According to embodiments of the invention the medical diagnosis classification task can be modelled as a supervised learning problem, where the input is a set of features related to patients (e.g. medical history, previous treatments, results of analyses, etc.) and the target is whether or not a patient is diagnosed with a condition in question.

Such datasets can present an imbalance, since most medical datasets are composed of predominantly "normal" (negative) samples and of a small percentage of "abnormal" (positive) ones. Depending on the considered population and the condition, the imbalance can be more or less extreme: e.g. ~30-35% of the minority class for the breast cancer dataset (Wisconsin) and Pima Indians diabetes dataset (for reference, see archive.ics.uci(dot)edu/ml/datasets/Breast+Cancer+Wisconsin+(Diagnostic) and data(dot)world/uci/pima-indians-diabetes, respectively); or ~2% of the samples belonging to the minority class for the mammography dataset (for reference, see Z. Ding: ""Diversified ensemble classifiers for highly imbalanced data learning and their application in bioinformatics" (2011)).

Correctly predicting the condition in this context can be critical to the patient. For instance, a mammography is the systematic screening test that is used for detecting breast cancer. Correctly predicting whether a mammographic mass is benign or malign can ensure timely clinical treatments. An early diagnosis of a malign mass can improve the patient's survival chances and the prognosis (for reference, see G.N. Hortobagyi: "Treatment of breast cancer", in *New England Journal of Medicine* 339.14 (1998): 974-984).

On the other hand, correctly predicting that a mass is benign can avoid unnecessary, invasive treatments and/or costly medical examinations. Typically, medical diagnosis is done in two stages. The first casts a wide net in order to catch anyone who might have the disease. There, high recall is important. The second stage of tests aims to have high precision to remove those who were false positives from the first test. Embodiments of the present invention can be suitably applied and are helpful in the second stage. From Table 3, one can deduce that the method according to an embodiment of the invention outperforms baselines in terms of Precision, F1-Score and Average Precision for mammography dataset. This shows that the method according to an embodiment of the invention has low number of false positives. Moreover, on Breast Cancer dataset the method according to an embodiment of the invention performs second best in terms of Precision and Average Precision.

The better performance of embodiments of the present invention in such medical diagnosis problems is directly linked to steps 1 and 3 (see FIG. 2) of the method. The generative oversampling step ensures generation of reliable positive samples, i.e. in this case realistic samples of patients that are diagnosed with the condition in question. Since the positive samples are in minority, it is important to generate samples that are more representative of the population as opposed to samples that might be marginal. Moreover, the diversity-aware weighted majority vote in step 3 is focused on the positive samples. By minimizing the diversity between the considered base learners, it ensures that the learners "agree" on the predictions on positive examples, which increases the certainty about the final prediction.

Embodiments of the present invention can also be applied, e.g., in the technical field of predictive maintenance. Generally, predictive maintenance relies on an equipment status (e.g. telemetry and usage data, past maintenance undertaken) in order to predict whether or not a piece of equipment is likely to break down. Most common maintenance strategies are routine maintenance (also known as preventive maintenance), which relies on regularly checking the equipment for possible faults, and emergency maintenance (also known as run-to-failure maintenance), which takes place after a piece of an equipment breaks down. By providing the right information at the right time for the right part, predictive maintenance can significantly improve the reliability of the equipment, reduce down time, reduce cost of maintenance and optimize scheduling of maintenance. Predictive maintenance is being implemented in many industries, e.g. manufacturing, transportation and IoT. However, one of the main challenges it faces are imbalanced datasets. In fact, it is common for the datasets describing the equipment to be imbalanced, since given a set of assets in operation (e.g. a fleet of trucks), it is likely that most of them are functioning properly, while the damaged assets are less in number.

The degree of imbalance in this use case can be relatively extreme. For Air Pressure System Failure Dataset for Scania trucks (for reference, see archive.ics.uci(dot)edu/ml/datasets/APS+Failure+at+Scania+Trucks) the minority class corresponds to 1,67% of complete samples. In order to achieve predictive maintenance goals, it is important to reduce the number of false positives and false negatives. False positives mean that a prediction is made that an asset will fail but it does not, which would entail unnecessary and possibly costly maintenance tasks and reduce the availability of the equipment. False negatives mean that a prediction is made that an asset will not break down, but it does, which would entail a high maintenance cost and possibly disturb the operation plan.

As mentioned earlier, it is an objective of the present invention to reduce the number of false positives. From the table depicted in FIG. 4, one can deduce that the method according to embodiments of the present invention outperforms baselines in terms of Precision, F1-Score and Average Precision for Scania predictive maintenance dataset. This shows that the method according to embodiments of the invention has low number of false positives. Again, this can be linked to the method's steps 1 and 3 (as described in detail above and as shown in FIG. 2) in that they alleviate the imbalance aspect by oversampling the minority class (in this case, damaged assets) and ensuring that the final prediction is focused on the minority class.

According to further use cases, embodiments of the present invention can also be applied, e.g., in the technical field of credit card fraud. Generally, identifying fraudulent credit card transactions is an important task for banks or card issuers, since it can not only improve reliability of their service and thus increase customer loyalty, but also reduce revenue loss. Typical fraud detection techniques include setting blanket rules about the amount, frequency or location of the transactions (for reference, see Kou, Yufeng, et al.: "Survey of fraud detection techniques", *IEEE International Conference on Networking, Sensing and Control*, 2004. Vol. 2. IEEE, 2004). However, legitimate transactions often get flagged. In fact, a report from Javelin Strategy and Research firm published in 2015 (for reference, see javelinstrategy (dot)com/press-release/false-positive-card-declines-push-consumers-abandon-issuers-and-merchants) estimates that only one in five detected fraud predictions is correct. These false predictions can lead to a revenue loss of $118 billion to a bank because declined customers later refrain from using the affected credit card. This is one of the reasons why it is important also in this use case to reduce the number of false positives (for reference, see R. Wedge et al.: "Solving the False Positives Problem in Fraud Prediction Using Automated Feature Engineering", *Joint European Conference on Machine Learning and Knowledge Discovery in Databases, Springer, Cham*, 2018).

Such fraud detection also relies on imbalanced datasets, where normal transactions largely outnumber the fraudulent ones. For example, in Credit Card Fraud Detection dataset (for reference, see kaggle(dot)com/mlg-ulb/creditcardfraud) the minority class makes up only 0.17% of the complete samples. From the table depicted in FIG. 4, one can deduce that the method according to embodiments of the present invention outperforms baselines in terms of Precision, F1-Score and Average Precision for this dataset. This shows that the method according to the invention has low number of false positives.

Again, this can be linked to the method's steps 1 and 3 (as described in detail above and as shown in FIG. 2). The generative oversampling step ensures generation of reliable positive samples i.e. in this case realistic samples of fraudulent transactions. On the other hand, the diversity-aware weighted majority vote in step 3 is focused on the positive samples. By minimizing the diversity between the considered base learners, it ensures that the learners "agree" on the predictions of positive examples, which increases the certainty about the final prediction and reduces the number of false positives.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An ensemble learning based method, executed by one or more computer processors, for a binary classification task on an imbalanced dataset, wherein the imbalanced dataset comprises a minority class comprising positive samples and a majority class comprising negative samples, the binary classification is applied in a second stage of diagnosis done in two stages to eliminate those with false positives on a first stage, the ensemble learning based method comprising:
generatively oversampling minority class examples included in the imbalanced dataset by synthetically generating the minority class examples using computer-implemented algorithms, thereby generating a modified dataset D' of the minority class;
using the modified dataset D' to generate a plurality of subsamples in a random and stratified way such that each subsample, of the subsamples, contains random examples while preserving a class-distribution ratio of the modified dataset D', and learning a base classifier on each of the subsamples using machine learning algorithms executed on the one or more computer processors to determine a plurality of base classifiers;
learning a diversity-aware weighted majority vote classifier by combining outputs of the base classifiers; and
executing the binary classification task by applying the diversity-aware weighted majority vote classifier to the imbalanced dataset,
wherein each of the base classifiers is assigned a weight in such a way that a diversity between the base classifiers on the positive samples is minimized,
wherein the binary classification task outputs a final prediction indicating samples as ones of the positive samples and the negative samples, and
wherein the diversity-aware weighted majority vote classifier is configured to process input data and generate classification outputs with low false positive rates for the second stage diagnosis.

2. The ensemble learning based method according to claim 1, wherein a minimization of the diversity between the base classifiers on the positive samples is determined by an optimization problem.

3. The ensemble learning based method according to claim 2, wherein the optimization problem is based on a pairwise comparison of the base classifiers and on a classification error of the base classifiers.

4. The ensemble learning based method according to claim 1, wherein synthetically generating the minority class examples comprises:
selecting, from the positive samples of the imbalanced dataset, safe examples using k-nearest neighbors,
wherein a positive sample, of the positive samples, is considered to be a safe example, of the safe examples, based upon determining that a majority vote of k-nearest neighbors for that example is positive.

5. The ensemble learning based method according to claim 4, wherein synthetically generating the minority class examples further comprises:
learning, for the selected safe examples, parameters for a multivariate probability distribution, and
generating the minority class examples based on the multivariate probability distribution using the parameters learned from the safe examples.

6. The ensemble learning based method according to claim 1, wherein the subsamples are generated in such a way that each of the subsamples contains random examples are of the modified dataset D'.

7. The ensemble learning based method according to claim 1, wherein the subsamples are generated in such a way that the examples contained in each of the subsamples have the same ratio of class distribution as the examples contained in the modified dataset D'.

8. The ensemble learning based method according to claim 1, wherein the base classifiers learned on the subsamples are based Decision Trees, Logistic Regression, or Support Vector Machines.

9. The ensemble learning based method according to claim 1, wherein the base classifier is learned on each of the subsamples.

10. The ensemble learning based method according to claim 1, wherein heterogeneous base classifiers are learned on different subsamples.

11. The ensemble learning based method according to claim 1, wherein the imbalanced dataset comprises medical diagnosis data, comprising samples of photographic, computer-graphic, or medical-tissue images, and wherein the binary classification task is a differentiation between the positive samples, as diagnosed with a condition in question, and the negative samples as not diagnosed with the condition in question.

12. The ensemble learning based method according to claim 1, wherein the imbalanced dataset comprises predictive maintenance data, comprising equipment status samples of a set of assets in operation, and wherein the binary classification task is a differentiation between the positive samples, as related to assets that are qualified to be defective or to become defective in the near future, and the negative samples as related to assets that are qualified to function properly without becoming defective in the near future.

13. The ensemble learning based method according to claim 1, wherein the imbalanced dataset comprises credit cards transactions data, and wherein the binary classification task is a differentiation between the positive samples, as related to transactions that are qualified to be fraudulent, and the negative samples related to transactions that are qualified to be legitimate.

14. A system configured to execute an ensemble learning based method, by one or more computer processors of the system, for a binary classification task on an imbalanced dataset, the imbalanced dataset comprising a minority class comprising positive samples and a majority class comprising negative samples, the binary classification being applied in a second stage of diagnosis done in two stages to eliminate those with false positives on a first stage, the ensemble learning based method comprising:
generatively oversampling minority class examples included in the imbalanced dataset by synthetically generating the minority class examples using computer-implemented algorithms, thereby generating a modified dataset D' of the minority class;

using the modified dataset D' generated dataset to generate a plurality of subsamples in a random and stratified way such that each subsample, of the subsamples, contains random examples while preserving a class-distribution ratio of the modified dataset D', and learning a base classifier on each of the subsamples using machine learning algorithms executed on the one or more processors to determine a plurality of base classifiers;

learning a diversity-aware weighted majority vote classifier by combining outputs of the base classifiers; and executing the binary classification task by applying the diversity-aware weighted majority vote classifier to the imbalanced dataset, wherein each of the base classifiers is assigned a weight in such a way that a diversity between the base classifiers on the positive samples only is minimized, wherein the binary classification task outputs a final prediction indicating samples as ones of the positive samples and the negative samples, and wherein the diversity-aware weighted majority vote classifier is configured to process input data and generate classification outputs with low false positive rates for the second stage diagnosis.

15. A non-transitory computer readable medium having, stored thereon, instructions for performing an ensemble learning based method executed by one or more computer processors for a binary classification task on an imbalanced dataset, the imbalanced dataset comprising a minority class comprising positive samples and a majority class comprising negative samples, the binary classification being applied in a second stage of diagnosis done in two stages to eliminate those with false positives on a first stage, the ensemble learning based method comprising:

generatively oversampling minority class examples included in the imbalanced dataset by synthetically generating the minority class examples using computer-implemented algorithms, thereby generating a modified dataset D' of the minority class;

using the modified dataset D' to generate a plurality of subsamples in a random and stratified way such that each subsample, of the subsamples, contains random examples while preserving a class-distribution ratio of the modified dataset D', and learning a base classifier on each of the subsamples using machine learning algorithms executed on the one or more processors to determine a plurality of base classifiers;

learning a diversity-aware weighted majority vote classifier by combining the outputs of the base classifiers; and executing the binary classification task by applying the diversity-aware weighted majority vote classifier to the imbalanced dataset, wherein each of the base classifiers is assigned a weight in such a way that a diversity between the base classifiers on the positive samples only is minimized, wherein the binary classification task outputs a final prediction indicating samples as ones of the positive samples and the negative samples, and wherein the diversity-aware weighted majority vote classifier is configured to process input data and generate classification outputs with low false positive rates for the second stage diagnosis.

\* \* \* \* \*